US010434419B2

(12) United States Patent
Tsuchiya et al.

(10) Patent No.: US 10,434,419 B2
(45) Date of Patent: Oct. 8, 2019

(54) INFORMATION PROCESSING DEVICE AND ASSIGNMENT METHOD FOR INPUT DEVICE

(71) Applicant: Sony Interactive Entertainment Inc., Tokyo (JP)

(72) Inventors: Akitsugu Tsuchiya, Kanagawa (JP); Yoshihiko Suwa, Kanagawa (JP); Shigeru Enomoto, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 39 days.

(21) Appl. No.: 15/111,582

(22) PCT Filed: Jan. 28, 2015

(86) PCT No.: PCT/JP2015/052371
§ 371 (c)(1),
(2) Date: Jul. 14, 2016

(87) PCT Pub. No.: WO2015/119018
PCT Pub. Date: Aug. 13, 2015

(65) Prior Publication Data
US 2016/0332082 A1 Nov. 17, 2016

(30) Foreign Application Priority Data

Feb. 4, 2014 (JP) ................. 2014-019673

(51) Int. Cl.
A63F 13/79 (2014.01)
G06F 3/0489 (2013.01)
(Continued)

(52) U.S. Cl.
CPC ............ *A63F 13/79* (2014.09); *A63F 13/213* (2014.09); *A63F 13/22* (2014.09); *A63F 13/235* (2014.09);
(Continued)

(58) Field of Classification Search
CPC ...... A63F 13/22; A63F 13/213; A63F 13/235; A63F 13/25; A63F 13/35
See application file for complete search history.

(56) References Cited

U.S. PATENT DOCUMENTS 7,509,290 B1 * 3/2009 McKee ................. H04L 63/083
705/50
7,625,284 B2 12/2009 Kay
(Continued)

FOREIGN PATENT DOCUMENTS

EP 1583321 A1 10/2005
JP 2001224858 A 8/2001
(Continued)

OTHER PUBLICATIONS

International Preliminary Report on Patentability for corresponding PCT Application No. PCT/JP2015/052371, 11 pages, dated Aug. 18, 2016.

(Continued)

*Primary Examiner* — Omkar A Deodhar
*Assistant Examiner* — Shauna-Kay Hall
(74) *Attorney, Agent, or Firm* — Matthew B. Dernier, Esq.

(57) ABSTRACT

A login processing unit performs a login process of a user. An assignment processing unit assigns an inputting device connected to an information processing apparatus to a user. An assignment processing unit controls an assignment process of the inputting device in response to the number of users who are in a login state and executes an assignment process which is different between a case in which the number of users in a login state is one and another case in which the number of users in a login state is two or more. The assignment processing unit assigns, when the number of (Continued)

users in a login state is one, the inputting device connected to the information processing apparatus to the one user.

10 Claims, 11 Drawing Sheets

(51) Int. Cl.
    *A63F 13/22*     (2014.01)
    *A63F 13/235*     (2014.01)
    *A63F 13/35*     (2014.01)
    *A63F 13/213*     (2014.01)
    *A63F 13/25*     (2014.01)
    *A63F 13/95*     (2014.01)
    *G06F 21/30*     (2013.01)
    *G06F 21/83*     (2013.01)

(52) U.S. Cl.
    CPC .............. *A63F 13/25* (2014.09); *A63F 13/35* (2014.09); *A63F 13/95* (2014.09); *G06F 3/0489* (2013.01); *G06F 21/30* (2013.01); *G06F 21/83* (2013.01); *G06F 2221/2105* (2013.01); *G06F 2221/2109* (2013.01); *G06F 2221/2117* (2013.01)

(56) References Cited

U.S. PATENT DOCUMENTS

| | | | |
|---|---|---|---|
| 8,261,090 B1* | 9/2012 | Matsuoka | G06F 21/32 713/186 |
| 9,289,678 B2 | 3/2016 | Lum | |
| 2003/0008712 A1* | 1/2003 | Poulin | A63F 13/12 463/42 |
| 2004/0235420 A1 | 11/2004 | Miyazaki | |
| 2005/0221895 A1 | 10/2005 | Gordon | |
| 2006/0154712 A1* | 7/2006 | Lum | A63F 13/22 463/1 |
| 2006/0154725 A1* | 7/2006 | Glaser | A63F 13/02 463/37 |
| 2006/0217201 A1* | 9/2006 | Berstis | G07F 17/32 463/42 |
| 2007/0003061 A1* | 1/2007 | Jung | H04L 63/061 380/270 |
| 2007/0093291 A1* | 4/2007 | Hulvey | A63F 13/06 463/36 |
| 2007/0111796 A1* | 5/2007 | C. Giaimo, III | A63F 13/02 463/42 |
| 2007/0184903 A1* | 8/2007 | Liu | A63F 13/12 463/42 |
| 2008/0076573 A1* | 3/2008 | Loehrer | G07F 17/32 463/42 |
| 2008/0109895 A1* | 5/2008 | Janevski | G06F 21/35 726/19 |
| 2008/0289031 A1* | 11/2008 | Anno | G06F 21/41 726/17 |
| 2008/0311969 A1 | 12/2008 | Kay | |
| 2009/0075687 A1* | 3/2009 | Hino | H05K 999/99 455/517 |
| 2010/0292006 A1 | 11/2010 | Terrell | |
| 2011/0021271 A1* | 1/2011 | Ikeda | A63F 13/235 463/30 |
| 2011/0080254 A1* | 4/2011 | Tran | G06K 9/00355 340/5.1 |
| 2011/0167355 A1* | 7/2011 | Shelansky | G06F 21/41 715/750 |
| 2011/0212783 A1* | 9/2011 | Dale | H04L 67/1002 463/42 |
| 2012/0102185 A1* | 4/2012 | Fernandes | H04L 67/38 709/224 |
| 2012/0268360 A1* | 10/2012 | Mikhailov | A63F 13/73 345/156 |
| 2013/0125113 A1* | 5/2013 | Do | G06F 9/455 718/1 |
| 2013/0160141 A1* | 6/2013 | Tseng | G06F 21/6245 726/28 |
| 2013/0208103 A1* | 8/2013 | Sands | G06F 21/31 348/78 |
| 2015/0379258 A1 | 12/2015 | Hino | |
| 2016/0158642 A1 | 6/2016 | Lum | |

FOREIGN PATENT DOCUMENTS

| | | |
|---|---|---|
| JP | 2002166049 A | 6/2002 |
| JP | 2004336740 A | 11/2004 |
| JP | 2005288180 A | 10/2005 |
| JP | 2006350473 A | 12/2006 |
| JP | 2009518059 A | 5/2009 |
| JP | 2010531159 A | 9/2010 |
| WO | 2007061598 A1 | 5/2007 |
| WO | 2008157477 A1 | 12/2008 |

OTHER PUBLICATIONS

International Search Report for corresponding PCT Application No. PCT/JP2015/052371, 4 pages, dated Apr. 28, 2015.
European Search report for corresponding EP Application No. 15746704.4, 7 pages, dated Nov. 6, 2017.

* cited by examiner

FIG. 2
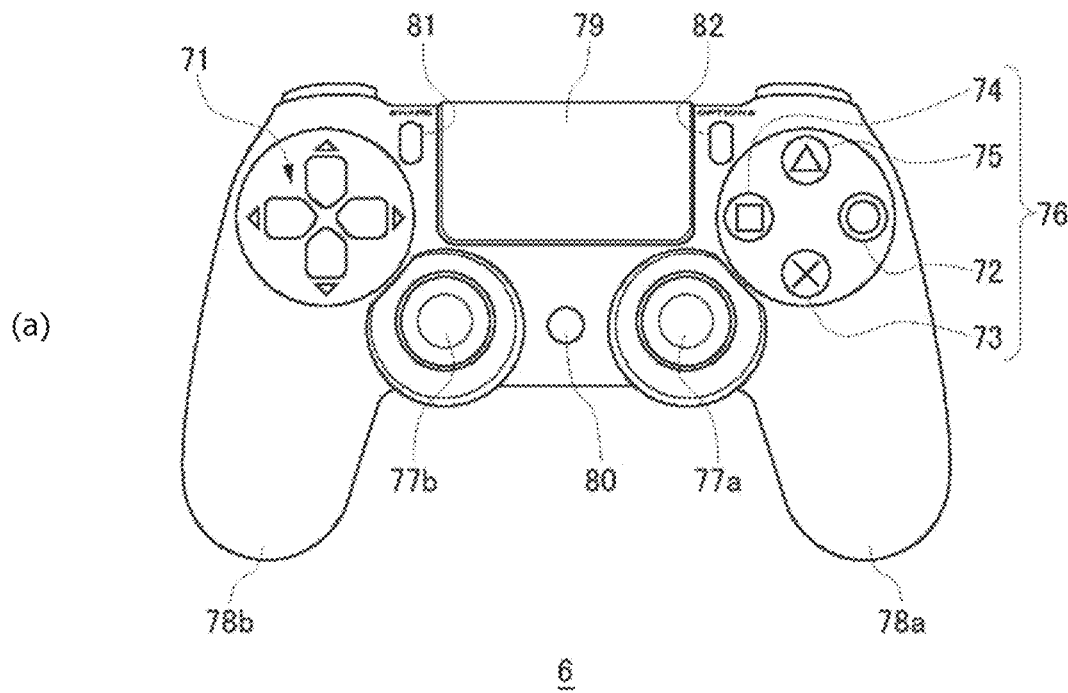
(a)
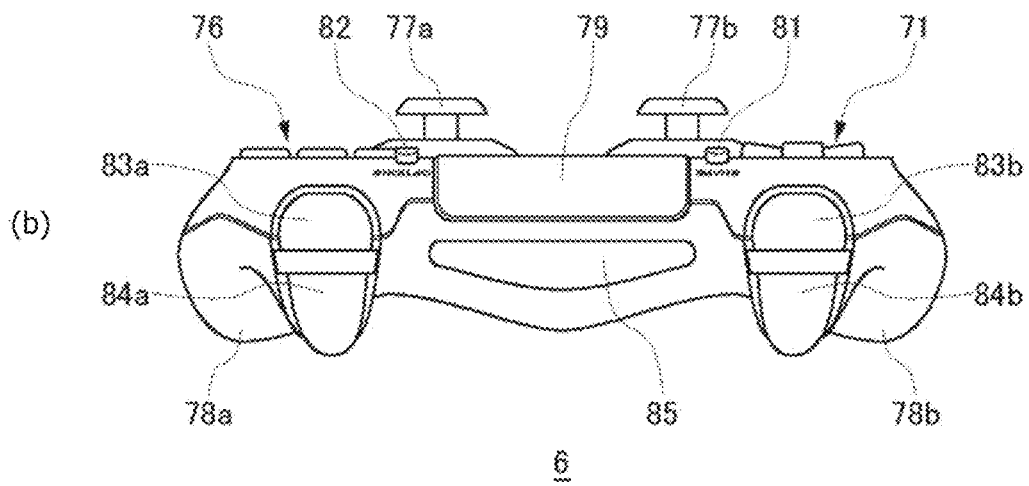
(b)

FIG.6
(a)
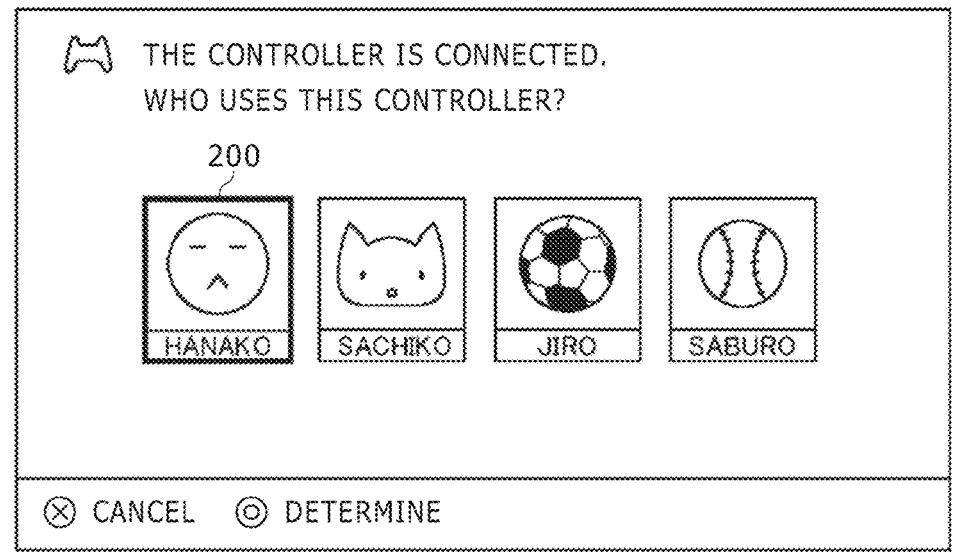
(b)
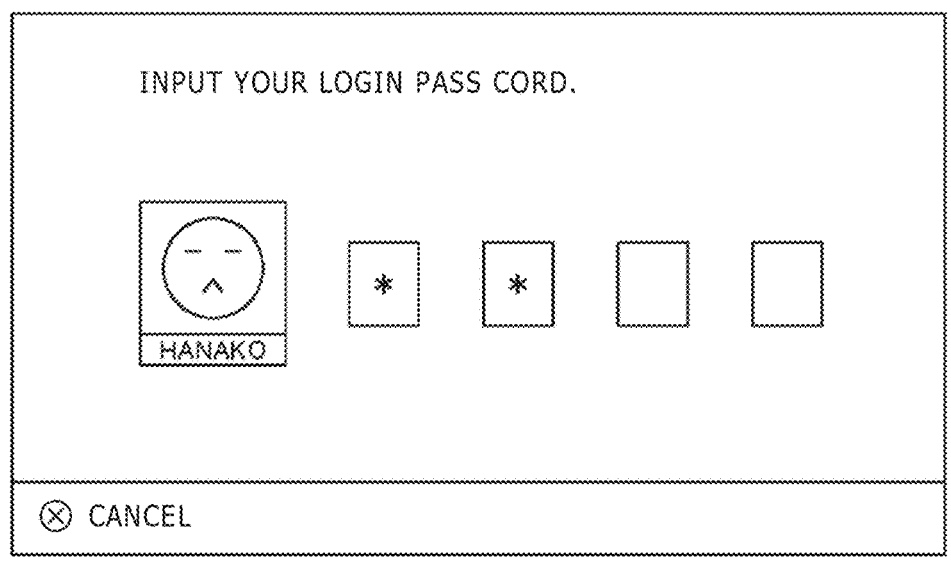

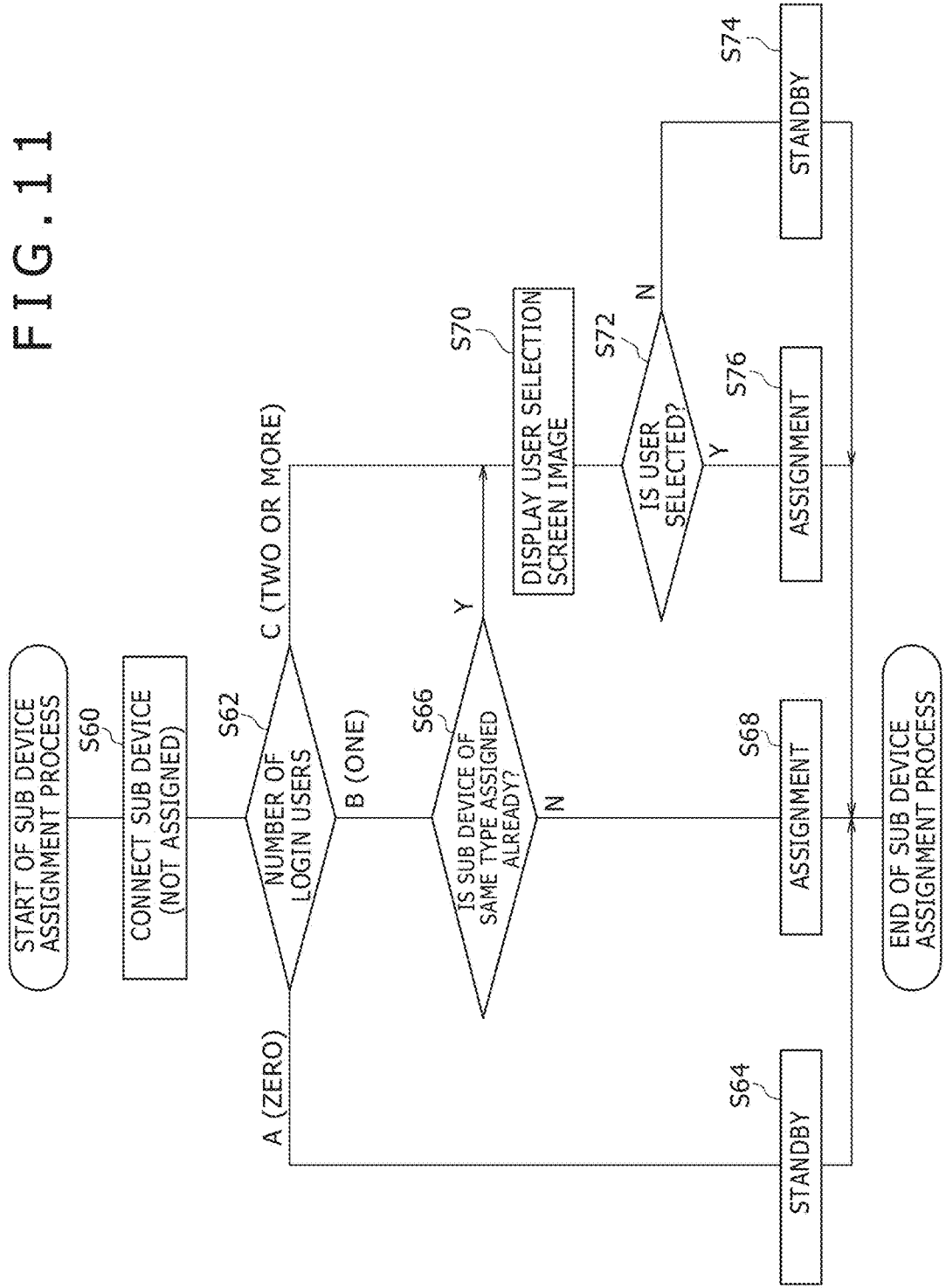

INFORMATION PROCESSING DEVICE AND ASSIGNMENT METHOD FOR INPUT DEVICE

TECHNICAL FIELD

The present invention relates to a technology for assigning an inputting device to a user in an information processing apparatus.

BACKGROUND ART

A game apparatus advances a game on the basis of operation information of a game controller operated by a user. In recent years, various inputting devices including not only a game controller but also a keyboard and so forth are connected to a game apparatus such that the user can provide a variety of operation information of the inputting devices to the game apparatus.

SUMMARY

Technical Problem

In a game apparatus to which a plurality of users can log in at the same time, it is necessary for the game apparatus to grasp to which user a used inputting device is assigned. As one simple technique, every time an inputting device is connected to the game apparatus, the game apparatus may inquire a user about who will use the inputting device. In this case, by declaring that the user itself uses the inputting device to the game apparatus, the game apparatus assigns the inputting device to the declaring user and, as a result, the game apparatus can recognize that operation information from the inputting device originates from the declaring user.

According to this technique, since the user itself declares use of the inputting device, the game apparatus can link the inputting device and the user to each other with certainty, and it can be considered that the technique is an effective technique. However, in a game apparatus in which one user can use plural kinds of inputting devices, the user receives an inquiry every time an inputting device is connected to the game apparatus, and some user may feel the linkage work cumbersome. Therefore, development of a technology for suitably assigning an inputting device connected to a game apparatus to a user is demanded.

It is to be noted that such needs as described above exist not only for a game apparatus but also for other information processing apparatus to which a plurality of users can log in at the same time, and also in such information processing apparatus, it is preferable for an inputting device to be suitably assigned to a user.

Therefore, it is an object of the present invention to provide a technology for suitably assigning an inputting device to a user.

Solution to Problem

In order to solve the problem described above, according to an aspect of the present invention, an information processing apparatus includes an assignment processing unit configured to assign an inputting device to a user who is in a login state, and an accepting unit configured to accept an input from the inputting device. The assignment processing unit controls an assignment process of the inputting device in response to a number of users who are in the login state.

According to another aspect of the present invention, a method for assigning an inputting device to a user includes controlling an assignment process of an inputting device in response to the number of users who are in a login state.

It is to be noted that arbitrary combinations of the components described above and conversions of the representation of the present invention between arbitrary ones of a method, an apparatus, a system, a recording medium a computer program and so forth are effective as modes of the present invention.

BRIEF DESCRIPTION OF DRAWINGS

FIG. 2(a) is a view depicting an appearance configuration of an upper face of a game controller, and FIG. 2(b) is a view depicting an appearance configuration of a side face on the far side of the game controller.

FIG. 6(a) is a view depicting an example of a user selection screen image, and FIG. 6(b) is a view depicting an example of a passcode inputting screen image.

FIG. 11 is a view illustrating a processing flow of sub device assignment control.

DESCRIPTION OF EMBODIMENT

Figure 1:
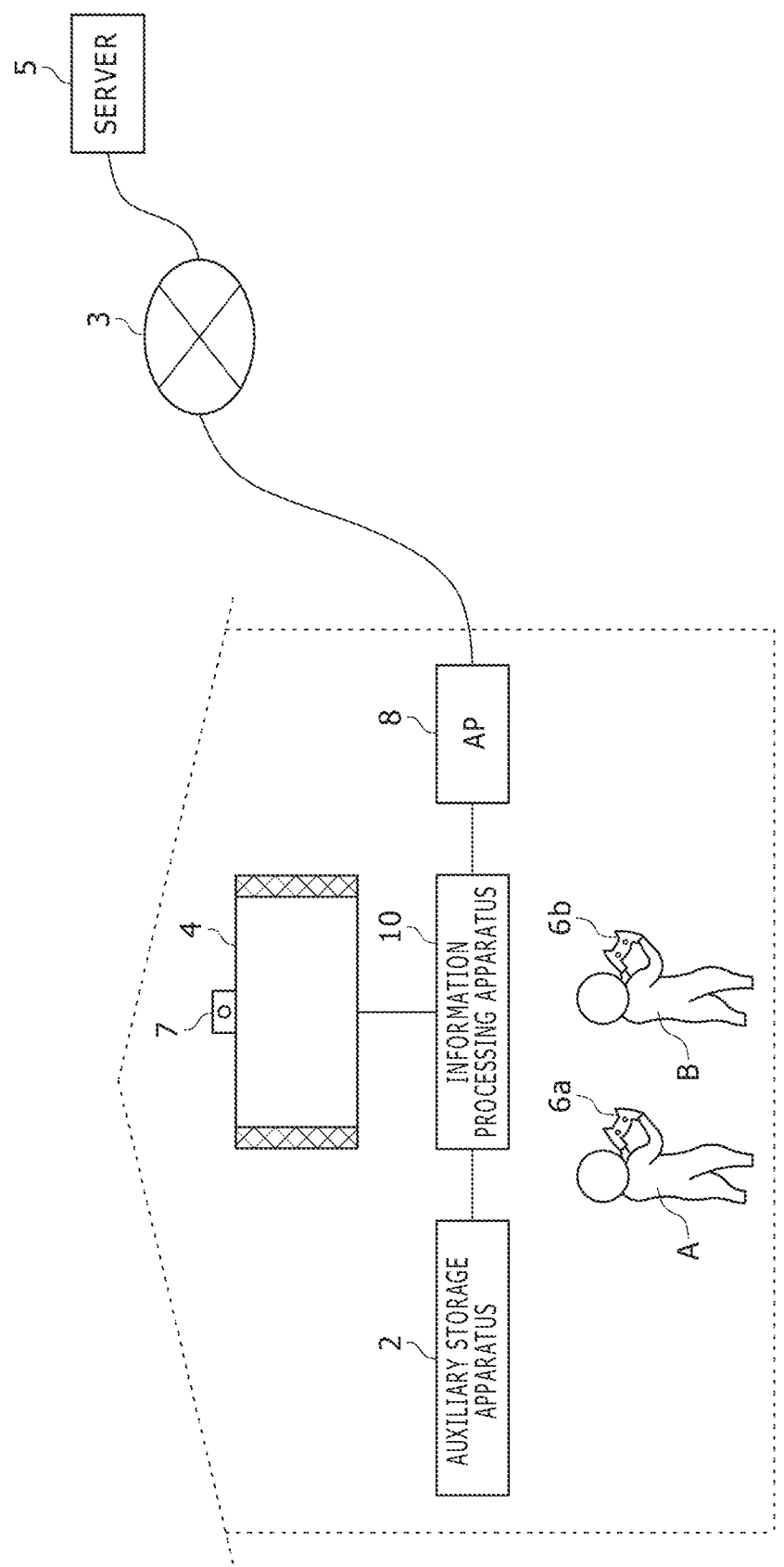
FIG. 1 is a view depicting an information processing system according to an embodiment of the present invention.

FIG. 1 depicts an information processing system 1 according to an embodiment of the present invention. The information processing system 1 includes an information processing apparatus 10 which is a user terminal, and a server 5. An access point (hereinafter referred to as "AP") 8 has functions of a wireless access point and a router, and the information processing apparatus 10 connects to the access point 8 by wireless connection or wire connection and connects the server 5 on a network 3 for communication.

An auxiliary storage apparatus 2 is a mass storage apparatus such as an HDD (hard disk drive) or a flash memory and may be an external storage apparatus which is connected to the information processing apparatus 10 by a USB (universal serial bus) or the like or may be a built-in storage apparatus. An outputting apparatus 4 may be a television set having a display unit which outputs an image and a speaker which outputs sound or may be a computer display unit. The information processing apparatus 10 is connected to a game controller 6, which is operated by a user, by wireless connection or wire connection, and the game controller 6 outputs an operation signal representative of a result of an operation by the user to the information processing apparatus 10. If the information processing apparatus 10 accepts an operation signal from the game controller 6, then it reflects the operation on processing of an OS (system software) or an application and outputs a result of processing from the outputting apparatus 4. The game controller 6 includes a plurality of inputting units such as a plurality of push-type operation buttons, an analog stick capable of inputting an analog amount and a rotary button. In the present embodiment, the information processing apparatus 10 may be a game apparatus which executes a game program, and the game controller 6 may be an inputting device which provides operation information of a user to the game apparatus.

In the information processing system 1, the game controller 6 is an example of an inputting device for inputting operation information to the information processing apparatus 10. As a different example of an inputting device, a device similar to the game controller 6 for providing operation information to a game program in order that the user may play a game is available. The game controller 6 and a device similar to the game controller 6 are each referred to as "main device" herein, and the user can play a game by using the main device singly.

Further, as another example of an inputting device, also a device used auxiliarily when the user plays a game using a main device is available. For example, as a different example of the inputting device, a device such as a keyboard, a mouse or a headset is available and is a device to be used auxiliarily during a game play assuming the presence of a main device. For example, a keyboard is used to input a message for some other user having a connection to the network 3 during a game play. Similarly, a headset with a microphone is used for communicating with some other user during a game play. Such devices as just described are different from the main device and are not used for operation of a game character but are used auxiliarily to the end. In the present specification, such a device as just described is referred to as "sub device."

It is to be noted that, supplementing a relationship between the main device and the sub device, a game program may accept not only an input from the main device but also an input from the sub device to advance a game. Also in this case, the game program operates supposing that the user operates the main device, and is capable of operating without the sub device. Conversely speaking, the game program does not operate only with operation information from the sub device, and, in this sense, an inputting device which by itself can cause a game to operate may be defined as the main device and an inputting device capable of being used together with the main device may be defined as sub device. In the information processing apparatus 10, a definition file in which attribute information which defines whether each of plural kinds of inputting devices capable of being connected to the information processing apparatus 10 is a main device or a sub device in advance is recorded is retained. It is to be noted that the definition file can be updated and, for example, if a game capable of operating only by an input from a headset with a microphone is developed, then the definition file may be updated, for example, by system update such that the headset is managed as the main device.

In the information processing apparatus 10 of the present embodiment, the main device and the sub device are inputting devices to be assigned to login users. It is to be noted that inputting devices which cannot be assigned to a login user exist from among inputting devices, and one of such inputting devices is a camera 7 for inputting a picked up image to the information processing apparatus 10.

The camera 7 which is an image pickup apparatus is provided in the proximity of the outputting apparatus 4 and picks up an image of a space around the outputting apparatus 4. While an example is depicted in FIG. 1 in which the camera 7 is attached to an upper portion of the outputting apparatus 4, the camera 7 may be disposed at a side portion or a lower portion of the outputting apparatus 4, and, in any event, the camera 7 is disposed at a position at which an image of the user positioned in front of the outputting apparatus 4 can be picked up. The camera 7 may be a stereo camera.

The server 5 provides a network service to a user of the information processing system 1. The server 5 manages a network account for specifying each user, and each user uses its network account to sign in to a network service provided by the server 5. The user can register save data of a game or a trophy which is a virtual award article acquired during game play into the server 5 by signing in to the network service from the information processing apparatus 10. Further, the user can be connected to another user via the network 3 to send or receive chat messages and voice messages.

A button configuration of the game controller 6 as an example of the inputting device is described below.

[Configuration of Upper Face Portion]

FIG. 2(a) depicts an appearance configuration of the upper face of the game controller. The user would grasp a left side grip portion 78b with the left hand thereof and grasp a right side grip portion 78a with the right hand thereof to operate the game controller 6. On an upper face of a housing of the game controller 6, a direction key 71, analog sticks 77a and 77b and four different operation buttons 76 which are inputting units are provided. The four different buttons 72 to 75 have different figures in different colors in order to allow distinction among them. In particular, on the ○ button 72, a red round mark is inscribed; on the x button 73, a blue cross mark is inscribed; on the □ button 74, a purple square mark is inscribed; and on the Δ mark 75, a green triangular mark is inscribed. A touch pad 79 is provided at a flat region between the direction key 71 and operation buttons 76 on the upper face of the housing. The touch pad 79 also functions as a press-type button which is depressed down when the user pushes and comes back to the original position when the user releases its hand.

A function button 80 is provided between the two analog sticks 77a and 77b. The function button 80 is used to switch on the power supply to the game controller 6 and simultaneously activate a communication function for connecting the game controller 6 and the information processing apparatus 10 to each other. If the game controller 6 is newly connected, then the information processing apparatus 10 executes a login process of a user. It is to be noted that, when the main power supply to the information processing apparatus 10 is off, if the function button 80 is depressed, then the information processing apparatus 10 accepts a connection request transmitted thereto from the game controller 6 as an instruction for switching on the main power supply. As a result, after the main power supply to the information processing apparatus 10 is switched on, the information processing apparatus 10 executes a login process of a user.

A SHARE button 81 is provided between the touch pad 79 and the direction key 71. The SHARE button 81 is utilized to input an instruction from the user to the OS or system software of the information processing apparatus 10. Meanwhile, an OPTIONS button 82 is provided between the touch pad 79 and the operation buttons 76. The OPTIONS button 82 is utilized to input an instruction from the user to an application (game) executed in the information processing apparatus 10. Both of the SHARE button 81 and the OPTIONS button 82 may be formed as push-type buttons.

[Configuration of Back Side Face Portion]

FIG. 2(b) depicts an appearance configuration of the back side face of the game controller. On the upper side of the back side face of the housing of the game controller 6, the touch pad 79 is provided so as to extend from the upper face of the housing, and a transversely elongated light emitting section 85 is provided on the lower side of the back side face of the housing. The light emitting section 85 has red (R), green (G) and blue (B) LEDs (light emitting diodes), which are turned on in accordance with emission color information transmitted thereto from the information processing apparatus 10. Where two game controllers 6a and 6b are used as depicted in FIG. 1, the information processing apparatus 10 may determine the lighting colors of the light emitting sections 85 of the game controllers 6a and 6b to different colors, to red and green, so that the users A and B can distinguish the respective game controller 6. Consequently, since each user can recognize the game controller 6 used by the user itself from the lighting color of the light emitting section 85, the possibility that the game controller 6 may be mistaken decreases.

On the housing back side face, an upper side button 83a and a lower side button 84a as well as an upper side button 83b and a lower side button 84b are provided at leftwardly and rightwardly symmetrical positions in the longitudinal direction. The upper side button 83a and the lower side button 84a are operated by the forefinger and the middle finger of the right hand of the user, respectively, and the upper side button 83b and the lower side button 84b are operated by the forefinger and the middle filter of the left hand of the user, respectively. Since the light emitting section 85 is provided between the arrangement of the upper side button 83a and the lower side button 84a on the right side and the arrangement of the upper side button 83b and the lower side button 84b on the left side as depicted in FIG. 2(b), it is not hidden by any of the fingers which operate associated buttons, and the camera 7 can suitably pick up an image of the light emitting section 85 which is in an on state. The upper side buttons 83 may be configured as push-type buttons, and the lower side buttons 84 may be configured as trigger-type buttons supported for turning motion.

Figure 3:
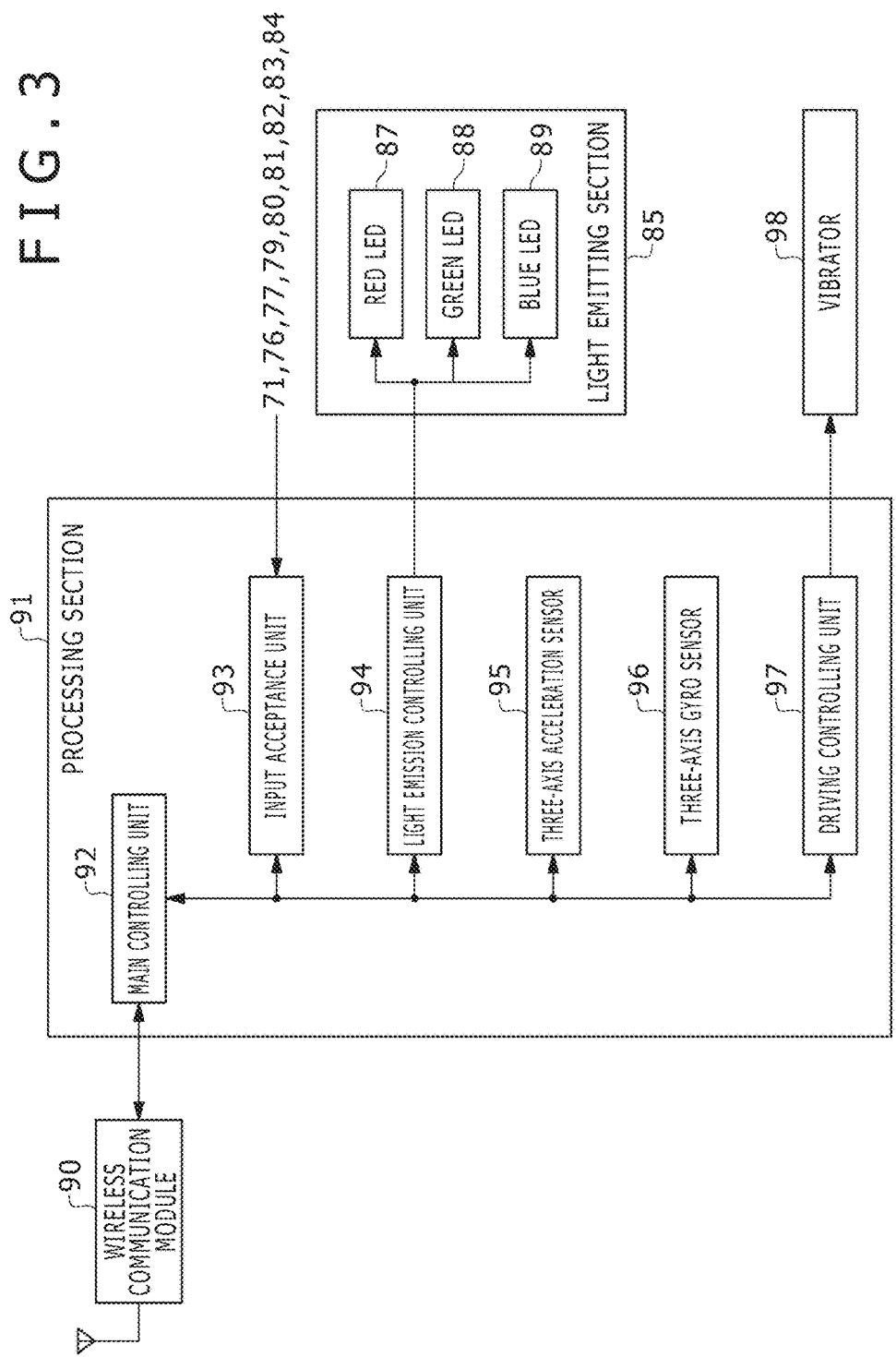
FIG. 3 is a view depicting an internal configuration of the game controller.

FIG. 3 depicts a configuration of the game controller 6. The game controller 6 includes a wireless communication module 90, a processing section 91, the light emitting section 85, and a vibrator 98. The wireless communication module 90 has a function of transmitting and receiving data to and from a wireless communication module of the information processing apparatus 10. The processing section 91 executes an intended process of the game controller 6.

The processing section 91 has a main controlling unit 92, an input acceptance unit 93, a light emission controlling unit 94, a three-axis acceleration sensor 95, a three-axis gyro sensor 96 and a driving controlling unit 97. The main controlling unit 92 carries out transmission and reception of necessary data to and from the wireless communication module 90.

The input acceptance unit 93 accepts input information from such inputting units as the direction key 71, operation buttons 76, analog sticks 77, touch pad 79, function button 80, SHARE button 81, OPTION button 82, upper side buttons 83 and lower side buttons 84 and sends the input information to the main controlling unit 92. The main controlling unit 92 converts the received input information into a predetermined control signal as occasion demands and supplies the control signal to the wireless communication module 90. Thus, the wireless communication module 90 sends the control signal to the information processing apparatus 10 at a predetermined timing. The light emission controlling unit 94 controls emission of light from a red LED 87, a green LED 88 and a blue LED 89 which configure the light emitting section 85.

In the information processing system 1 of the present embodiment, if the user depresses the function button 80 while the game controller 6 is in a power-off state, then the power supply to the game controller 6 is turned on and the main controlling unit 92 generates a connection request to the information processing apparatus 10. The wireless communication module 90 transmits the connection request to the information processing apparatus 10. At this time, even if the information processing apparatus 10 is in a main power supply off state, since the wireless communication module in the information processing apparatus 10 is in an active state even in the main power supply off state, the information processing apparatus 10 turns on the main power supply in response to reception of the connection request thereby to start up the OS (system software) to establish wireless connection to the game controller 6. After the wireless connection to the game controller 6 is established, the information processing apparatus 10 executes a login process of a user.

The system software of the information processing apparatus 10 determines a lighting color of the light emitting section 85 of the game controller 6 from which the connection request has been received and transmits the lighting color information to the game controller 6. At this time, the system software preferably analyzes the color information included in the space whose image is picked up by the camera 7 and specifies colors which are not included in environment colors as far as possible to determine a lighting color of the light emitting section 85. This makes it possible to suitably detect the light emitting section 85 which is to be turned on with the designated light color from the picked up image of the camera 7 after the light emitting section 85 is turned on. An image picked up by the camera 7 may be provided to the information processing apparatus 10 such that a result of detection of a movement of the game controller 6 or of the user is utilized for game advancement. Accordingly, the camera 7 functions as an inputting device to the information processing apparatus 10.

The lighting color information received by the wireless communication module 90 is passed to the main controlling unit 92, and the main controlling unit 92 notifies the light emission controlling unit 94 of the lighting color information. Consequently, the light emission controlling unit 94 can control the light emitting section 85 to emit light with the designated lighting color.

The vibrator 98 is configured including an eccentric motor and so forth and is driven by the driving controlling unit 97. The three-axis acceleration sensor 95 detects acceleration components in the three-axis directions of the XYZ directions of the game controller 6, and the three-axis gyro sensor 96 detects angular velocities in an XZ plane, a ZY plane and a YX plane.

Figure 4:
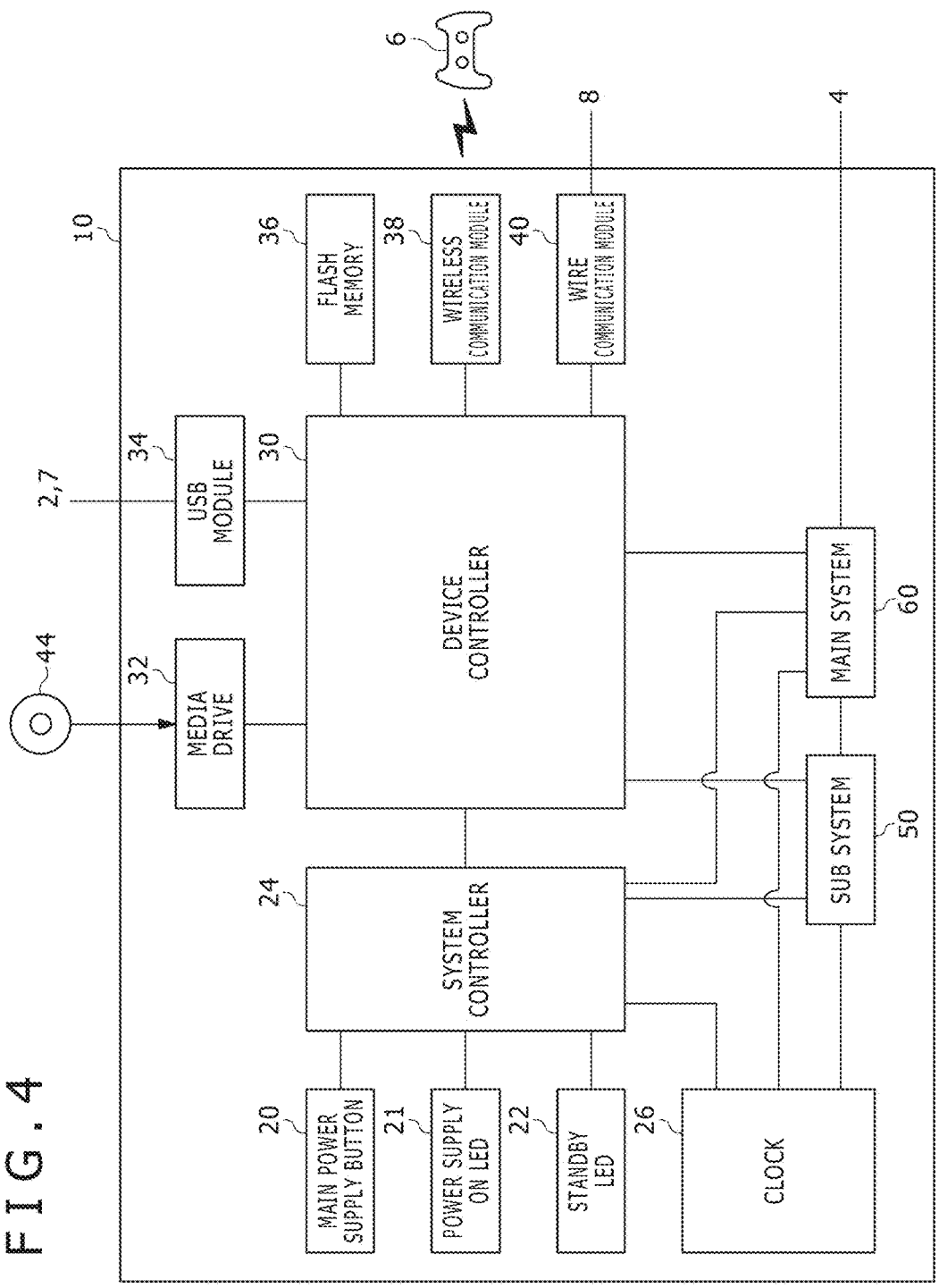
FIG. 4 is a view depicting functional blocks of an information processing apparatus.

FIG. 4 depicts a functional block diagram of the information processing apparatus 10. The information processing apparatus 10 is configured from a main power supply button 20, a power supply ON LED 21, a standby LED 22, a system controller 24, a clock 26, a device controller 30, a media drive 32, a USB module 34, a flash memory 36, a wireless communication module 38, a wire communication module 40, a sub system 50 and a main system 60.

The main system 60 includes a main CPU (central processing unit), a memory and a memory controller which are main storage apparatuses, a GPU (graphics processing unit)

and so forth. The GPU is utilized principally for arithmetic operation processing of a game program. The functions mentioned are configured as a system-on-chip on a single chip. The main CPU starts up the OS and has a function of executing an application installed in the auxiliary storage apparatus 2 under an environment provided by the OS.

The sub system 50 includes a sub CPU, a memory and a memory controller which are main storage apparatuses, and so forth, but does not include a GPU. The number of circuit gates of the sub CPU is smaller than that of the main CPU, and the operation power consumption of the sub CPU is lower than that of the main CPU. The sub CPU operates while the main CPU is in a standby state as described hereinabove, and the processing functions of the sub CPU are restricted in order to suppress the power consumption low. It is to be noted that the sub CPU and the memory may be formed on different chips from each other.

The main power supply button 20 is an inputting unit to which operation inputting is carried out by the user and is provided on a front face of the housing of the information processing apparatus 10. The main power supply button 20 is operated to turn on or off the power supply to the main system 60 of the information processing apparatus 10. In the following description, that the main power supply is in an on state signifies that the main system 60 is in an active state, and that the main power supply is in an off state signifies that the main system 60 is in a standby state. The power supply ON LED 21 is turned on when the main power supply button 20 is turned on, and the standby LED 22 is turned on when the main power supply button 20 is turned off.

The system controller 24 detects depression of the main power supply button 20 by the user. If the main power supply button 20 is depressed when the main power supply is in an off state, then the system controller 24 acquires the depression operation as an "on instruction." However, if the main power supply button 20 is depressed when the main power supply is in an on state, then the system controller 24 acquires the depression operation as an "off instruction." After the system controller 24 acquires the on instruction, the main system 60 executes a login process of a user.

The main CPU has a function of executing a game program installed in the auxiliary storage apparatus 2 or a ROM (read-only memory) medium 44 while the sub CPU does not have such a function as just described. However, the sub CPU has a function of accessing the auxiliary storage apparatus 2 and a function of transmitting and receiving data to and from the server 5. The sub CPU is configured so as to have only such restricted processing functions and therefore can operate with low power consumption in comparison with the main CPU. The functions of the sub CPU are executed while the main CPU is in a standby state. Since the sub system 50 is operative when the main system 60 is in a standby state, the information processing apparatus 10 normally maintains a sign-in state in the network service provided by the server 5.

The clock 26 is a real time clock and generates and supplies date and time information at present to the system controller 24, sub system 50 and main system 60.

The device controller 30 is configured as an LSI (large-scale integrated circuit) which executes transfer of information between devices like a south bridge. As depicted in FIG. 4, to the device controller 30, such devices as system controller 24, media drive 32, USB module 34, flash memory 36, wireless communication module 38, wire communication module 40, sub system 50 and main system 60 are connected. The device controller 30 absorbs differences in electric characteristics of and differences in data transfer speed between the devices to control timings of data transfer.

The media drive 32 is a drive apparatus which drives, when a ROM medium 44 in which application software of a game and so forth and license information are recorded is loaded in the media drive 32, the ROM medium 44 and reads out a program, data and so forth from the ROM medium 44. The ROM medium 44 is a read-only recording medium such as an optical disk, a magneto-optical disk or a Blu-ray disk.

The USB module 34 is a module for connecting to an external apparatus by a USB cable. The USB module 34 connects to the auxiliary storage apparatus 2 and the camera 7 through a USB cable. It is to be noted that, though not depicted, the USB module 34 may be connected to an inputting device such as a main device or a sub device other than the game controller 6 through a USB cable. Such inputting devices as described above are connected to the information processing apparatus 10 by the user inserting a USB terminal thereof into the USB module 34 when the user is to use the inputting device. It is to be noted that the inputting devices described above are sometimes left connected to the USB module 34 through a USB cable after the user logs out. The information processing apparatus 10 of the present embodiment has a function for suitably assigning an inputting device normally connected to the USB module 34 or an inputting device newly connected after login of the user to the user.

The flash memory 36 is an auxiliary storage device which configures an internal storage. The wireless communication module 38 communicates by wireless communication, for example, with the game controller 6 by a communication protocol such as the Bluetooth (registered trademark) protocol or the IEEE (institute of electrical and electronic engineers) 802.11 protocol. It is to be noted that the wireless communication module 38 may be compatible with a third generation digital portable telephone system in compliance with the IMP-2000 (international mobile telecommunication 2000) prescribed by the ITU (international telecommunication union). Alternatively, the wireless communication module 38 may be compatible with a digital portable telephone system of a further different generation. The wire communication module 40 communicates by wireless communication with an external apparatus and connects to the network 3, for example, through the access point 8.

Plural kinds of login processes are prepared for the information processing apparatus 10 of the present embodiment and, if a login request is issued from a user, then the information processing apparatus 10 determines one login process to be executed in accordance with system setting. Outline of three kinds of representative login processes in the information processing apparatus 10 is described below.

<Login Process 1>

A login process 1 is a process for automatically allowing a user to log in when the information processing apparatus 10 has setting for automatic login of one user. In the login process 1, the user with regard to which setting of automatic login is provided is caused to log in just after the information processing apparatus 10 is started up or just after the information processing apparatus 10 resumes from a system suspended state. For example, in such a case that the user is in a single life and there normally is no other user to log in, if setting for automatic login is established, then the user can automatically log in without the intervention of a user selection screen in a login process 2 hereinafter described in response to an on operation of the main power supply button 20 in a state in which the main power supply to the information processing apparatus 10 is off. It is to be noted that the login process 1 is executed when there is no login user, but the login process 1 is not executed if there is a user who logs in already.

Two kinds of login processes described below are executed when there is no setting for automatic login. Between the two login processes, the login process 2 is executed when setting of face authorization login is not available, and the login process 3 is executed when setting for face authorization login is available.

<Login Process 2>

The login process 2 is a process for allowing login of a user selected on a user selection screen image displayed on the outputting apparatus 4. In the login process 2, if a user operates the function button 80 of the game controller 6 to transmit a login request to the information processing apparatus 10, then the information processing apparatus 10 displays a user selection screen image on the outputting apparatus 4. Then, if the user operates the game controller 6 to select an own icon in the user selection screen image and input a passcode for login as occasion demands, then the information processing apparatus 10 performs user authorization to allow the user to log in. It is to be noted that the icon which makes a selection target is exemplary, and the target to be selected by the user may be information for specifying the user itself, for example, a user name displayed by a text, a photograph of the user or the like.

<Login Process 3>

The login process 3 is a process which allows a user to log in when a face authorization of the user is performed utilizing a picked up image by the camera 7 and the detected face image coincides with the face of the user registered in the information processing apparatus 10. In the login process 3, if the user depresses the main power supply button 20 or the game controller 6 is connected to the information processing apparatus 10, then the information processing apparatus 10 performs face authorization of the user included in a picked up image and urges the user to operate a predetermined action to allow the user to log in.

While the login processes described above are representative login processes, also some other login process is prepared in the information processing apparatus 10. If the main power supply button 20 is depressed where setting for automatic login and setting for face authorization login are not available in the information processing apparatus 10 and besides no one logs in, then the information processing apparatus 10 may cause a user selection screen image to be displayed on the outputting apparatus 4. Besides, where setting for face authorization login is available and a login request is generated in response to an operation of the function button 80, face authorization of the user may be performed on the background while a user selection screen image is displayed on the outputting apparatus 4 by the information processing apparatus 10. It is to be noted that, if face authorization cannot be performed within a predetermined time period in the login process 3, then a user selection screen image may be displayed on the outputting apparatus 4.

Figure 5:
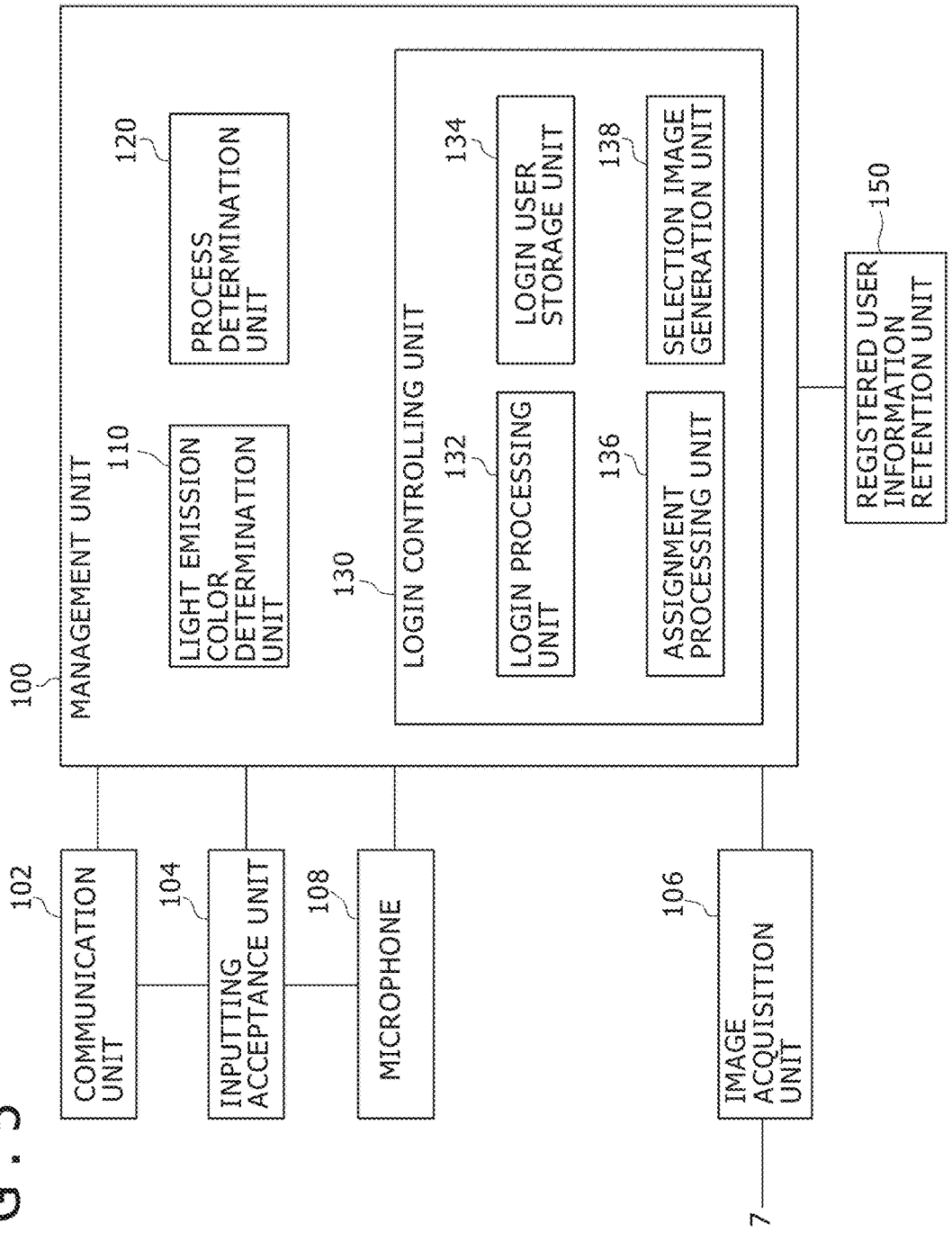
FIG. 5 is a view depicting an internal configuration of the information processing apparatus.

FIG. 5 depicts an internal configuration of the information processing apparatus 10. The information processing apparatus 10 includes a communication unit 102, an input acceptance unit 104, an image acquisition unit 106, a microphone 108, a management unit 100 and a registered user information retention unit 150. The input acceptance unit 104 has a function of accepting an input from the user, for example, an input from an inputting device. The function of the management unit 100 is implemented by an OS (system software) of the information processing apparatus 10 and an application executed by the OS or a memory, and includes a light emission color determination unit 110, a process determination unit 120 and a login controlling unit 130.

The login controlling unit 130 includes a login processing unit 132, a login user storage unit 134, an assignment processing unit 136 and a selection image generation unit 138. The login processing unit 132 has a function of performing a login process of a user, and the assignment processing unit 136 has a function of assigning an inputting device to a user. If an inputting device connected to the information processing apparatus 10 is assigned to a user by the assignment processing unit 136, then the information processing apparatus 10 can decide by which user an input from the inputting device is performed. It is to be noted that, as the inputting device, an inputting device capable of being assigned to a login user and another inputting device capable of being not assigned to a login user are available, and an inputting device to be assigned to a login user by the assignment processing unit 136 is at least one of main devices such as a game controller and a joystick and sub devices such as a headset. The inputting device capable of being not assigned to the user is the camera 7. It is to be noted that a single microphone and a headphone without a microphone may be handled as an inputting device not to be assigned to the login user. The selection image generation unit 138 generates a user selection screen image which allows selection of a user and causes the outputting apparatus 4 to display the generated screen image. The communication unit 102 exhibits the functions of the wireless communication module 38 and wire communication module 40 depicted in FIG. 4. The microphone 108 may be such as provided on a headset which is a sub device.

The components depicted as functional blocks for performing various processes in FIG. 5 can be configured, in hardware, from circuit blocks, a memory and some other LSIs and are implemented, in software, by a program loaded in the memory or the like. Accordingly, it is understood by those skilled in the art that the functional blocks can be implemented in various modes such as only from hardware, only from software or from a combination of hardware and software, and are not limited to only one of the various modes.

According to the information processing apparatus 10 of the present embodiment, also a function for suitably assigning an inputting device to a user is one of characteristics in addition to a function for supporting login operation of a user. In order to log in to the OS of the information processing apparatus 10, as a premise therefor, it is necessary for a user to acquire a user account in advance and register various kinds of user information in the information processing apparatus 10. A user who has a registration of a user account in the information processing apparatus 10 is hereinafter referred to sometimes as "registered user." The information processing apparatus 10 is an apparatus to which a plurality of registered users can log in at the same time and, if a plurality of users log in at the same time, then the information processing apparatus 10 can store save data of the users individually.

The registered user information retention unit 150 retains various kinds of information relating to registered users and particularly retains, in an associated relationship of a user account, a login passcode, a sign-in ID (identification) for signing in to the server 5, a network account, an online ID of a user, a user icon for representation of the user and so forth as registered user information. It is to be noted that, regarding a registered user who has a registration of a face image in advance for a face authorization process, the registered user information retention unit 150 retains face identification data as the registered user information in an associated relationship with the user account.

Here, while the face identification data is characteristic amount data of a face image of the registered user, the face identification data may be face image data itself. The face identification data is data used as a comparison target in the face recognition process by the login processing unit 132, and is generated in accordance with a face recognition algorithm adopted by the login processing unit 132. For example, the face identification data may be data obtained by extracting a relative position or a size of parts of the face and shapes of the eyes, nose, cheek bones and chin as characteristics. Further, the face identification data may be data obtained by extracting difference data from standard data of a face image. What face identification data is to be extracted is determined depending upon a face recognition algorithm adopted by the login processing unit 132. It is to be noted that, regarding a registered user who does not have a registration of a face image, naturally face identification data is not included in the registered user information retention unit 150.

In the present embodiment, registered user information of a user A (online ID is "HANAKO"), a user B (online ID is "SACHIKO") and some other user is stored in the registered user information retention unit 150. A process for assigning an inputting device to a user upon and after login of a registered user is described below.

As described already, a main device is a device for progressing an application such as a game to be executed by the information processing apparatus 10 and includes the game controller 6 and an inputting device similar to the game controller 6. For example, as an inputting device similar to the game controller 6, a joystick, a controller for exclusive use for a specific game such as a handle controller used in a car race game are available. Further, a sub device is a device used auxiliarily by a user during execution of an application and includes an inputting device such as a keyboard, a mouse or a headset. The assignment processing unit 136 has a function of controlling an assignment process of an inputting device in response to the number of users having logged in already. An apparatus ID is set to each of the inputting devices, and the assignment processing unit 136 specifies the type of the inputting device from the apparatus ID of the inputting device. In the example described above, the type of the inputting device indicates one of a game controller, a joystick, a handle controller, a keyboard, a mouse and a headset.

An assignment process of a device in the representative login processes 1 to 3 is described below. It is to be noted that a device assignment process for a user who logs in at first in a state in which there is no login user is described below.

<Device Assignment Process in Login Process 1>

As described above, the login process 1 is executed in the case where one registered user is set as an automatic login user and there is no user who logs in already. Where setting for automatic login is available in the information processing apparatus 10, the process determination unit 120 determines the login process 1 as a login process to be executed and the login controlling unit 130 executes the login process 1.

If an on operation of the main power supply button 20 of the information processing apparatus 10 is performed in a state in which the main power supply to the information processing apparatus 10 is off, then the input acceptance unit 104 accepts a login request and the login processing unit 132 allows the user, who is set for automatic login, to log in to the information processing apparatus 10. For example, if the user A is set as a target of automatic login, then the login processing unit 132 causes the user A to log in. In this manner, the login process 1 is executed when the input acceptance unit 104 accepts a login request in a state in which automatic login setting is available and beside there is no login user. The login processing unit 132 stores login information, namely, information for specifying the user A (user account), into the login user storage unit 134.

After the login processing unit 132 causes the user A to log in, the assignment processing unit 136 assigns an inputting device connected to the information processing apparatus 10 to the login user. After the inputting device is assigned to the login user, the assignment processing unit 136 stores the apparatus ID of the inputting device in an associated relationship with the user account into the login user storage unit 134.

If a main device such as the game controller 6 is connected to the information processing apparatus 10 in a state in which only the user A logs in, then the assignment processing unit 136 automatically assigns the connected main device to the user A. On the other hand, if a sub device such as the keyboard is connected to the information processing apparatus 10 in a state in which only the user A logs in, then the assignment processing unit 136 automatically assigns the connected sub device to the user A.

It is to be noted that, where an inputting device is normally connected to the USB module 34 through a USB cable, if the main power supply to the information processing apparatus 10 is turned on, then a USB device linked by a USB cable is recognized by the information processing apparatus 10 and is placed in a connected state. If the user A automatically logs in thereafter, then the assignment processing unit 136 retrospectively assigns the inputting device to the user A. In this manner, if a new inputting device is connected to the information processing apparatus 10 after one user logs in or if there exists an inputting device which is not assigned to any user at a time point at which one user logs in, then the assignment processing unit 136 assigns the inputting device to the login user.

If a device of a type similar to that of the device assigned to the login user already is connected to the information processing apparatus 10, then the assignment processing unit 136 does not assign the device of the same type to the same login user. For example, if one game controller 6a is assigned to the user A, then when a different game controller 6b is thereafter connected to the information processing apparatus 10, the assignment processing unit 136 does not assign the game controller 6b to the user A. In this case, a situation is assumed that a user other than the user A wants to log in, and, therefore, a user selection screen image is displayed on the outputting apparatus 4, and a user who wants to use the different game controller 6b declares that the user will use the game controller 6b. The assignment processing unit 136 decides whether or not the connected inputting device is an inputting device of the same type by referring to the apparatus ID.

The foregoing is a device assignment process where the user A is set as a target of automatic login. A device assignment process in the login processes 2 and 3 where setting for automatic login is not available is described below.

<Device Assignment Process in Login Process 2>

If a user depresses the function button 80 of the game controller 6, then a connection request is transmitted to the information processing apparatus 10. In the information processing apparatus 10, the communication unit 102 accepts the connection request and connects the game controller 6 and the communication unit 102 to each other. The connection request by depression of the function button 80 is transmitted as a login request to the input acceptance unit 104, and the input acceptance unit 104 transmits the login request to the management unit 100. It is to be noted that the login request may be automatically generated and transmitted to the information processing apparatus 10 after the information processing apparatus 10 and the game controller 6 are connected to each other.

If the process determination unit 120 confirms that setting for automatic login is not available and that setting for face authorization login is not available, then the process determination unit 120 determines the login process 2 as a login process to be executed and the login controlling unit 130 executes the login process 2.

The selection image generation unit 138 reads out the registered user information retained in the registered user information retention unit 150 and generates a selection image for selecting users registered in the information processing apparatus 10. In particular, the selection image generation unit 138 reads out user icons and online IDs (or nicknames on a network) from within the registered user information and causes the outputting apparatus 4 to display a user selection screen image in which the online IDs of the registered users are arranged in the form of a list. Although the selection screen image is an assign screen image for assigning an inputting device to a user, in the login process 2, the selection image has significance as a login screen image for allowing the user to log in.

FIG. 6(a) is a view depicting an example of a user selection screen image. The selection image generation unit 138 reads out the user icons and online IDs of all registered users retained in the registered user information retention unit 150 and displays the read out user icons and online IDs in the form of a list for selection by a user. A user icon and an online ID are hereinafter referred to as "user specification information." It is to be noted that the user specification information is not to a user icon and an online ID but may be information for identifying a user, namely, a photograph of a user, a user name, a nickname or the like.

In the login process 2, the selection image generation unit 138 displays, in the user selection screen image, a focus frame 200 surrounding one piece of user specification information for movement on the list. The user can select user specification information of the user itself by operating an inputting unit of the game controller 6 to move the focus frame 200 to a displaying region of the own user specification information and then depressing a determination button (o button 72) of the game controller 6.

Here, if it is assumed that a user who requests login is the user A and operates the game controller 6 to select "HANAKO" on the selection screen image, then the login processing unit 132 causes the outputting device 4 to display an inputting screen image of a passcode depicted in FIG. 6(b). Here, if the user A inputs the registered passcode, then the login processing unit 132 decides whether the inputted passcode is same as the login passcode of HANAKO retained in the registered user information retention unit 150. Then, if the inputted passcode is same as the retained passcode, the login processing unit 132 permits the user A (HANAKO) to log in. The login processing unit 132 stores login information, namely, information for specifying the user A (HANAKO) (user account), into the login user storage unit 134. The following description is given assuming that the user A is HANAKO.

After the login processing unit 132 accepts login of the user A, the assignment processing unit 136 assigns an inputting device connected to the information processing apparatus 10 to the login user. After the assignment processing unit 136 assigns the inputting device to the login user, the assignment processing unit 136 stores the apparatus ID of the inputting device in an associated relationship with the user account into the login user storage unit 134.

If, in a state in which only the user A logs in, a main device is newly connected to the information processing apparatus 10 or is placed in a connected state from before login, then the assignment processing unit 136 automatically assigns the connected main device to the user A. In the login process 2, when the game controller 6 is connected first to the information processing apparatus 10 and then the user A is selected in the user selection screen image, the login processing unit 132 causes the user A to log in. Accordingly, upon login of the user A, the game controller 6 is in a connected state already, and the assignment processing unit 13 automatically assigns the game controller 6 to the user A. It is to be noted that the login process of the user A and the assignment process of the game controller 6 are actually performed almost at the same time.

On the other hand, if a sub device such as a keyboard is connected to the information processing apparatus 10 in a state in which only the user A logs in, then the assignment processing unit 136 automatically assigns the connected sub device to the user A. It is to be noted that, where the inputting device is normally connected to the USB module 34 through a USB cable, if the user A logs in, then the assignment processing unit 136 retrospectively assigns the inputting device to the user A. In this manner, after one user is logged in, if a new inputting device is connected to the information processing apparatus 10 or there exists an inputting device which is not assigned to any user as yet, then the assignment processing unit 136 assigns the inputting device to the login user.

If a device of a type similar to that of a device assigned to a login user already is connected to the information processing apparatus 10, then the assignment processing unit 136 does not assign the device of the same type to the same login user. For example, if a joystick is assigned to the user A and subsequently a different joystick is connected to the information processing apparatus 10, then the assignment processing unit 136 does not assign the different joystick to the user A. In this case, a user selection screen image serving also as a login screen image is displayed again, and a user who desires use of the different joystick declares that the user itself will use the different joystick.

<Device Assignment Process in Login Process 3>

If the user depresses the main power supply button 20, then depression information is transmitted to the input acceptance unit 104, and the input acceptance unit 104 accepts and transmits the depression information as a login request from the user to the management unit 100. If the process determination unit 120 confirms that setting for automatic login is not available and setting for face authorization login is available, then the process determination unit 120 determines the login process 3 as a login process to be executed and the login controlling unit 130 executes the login process 3.

Figure 7:
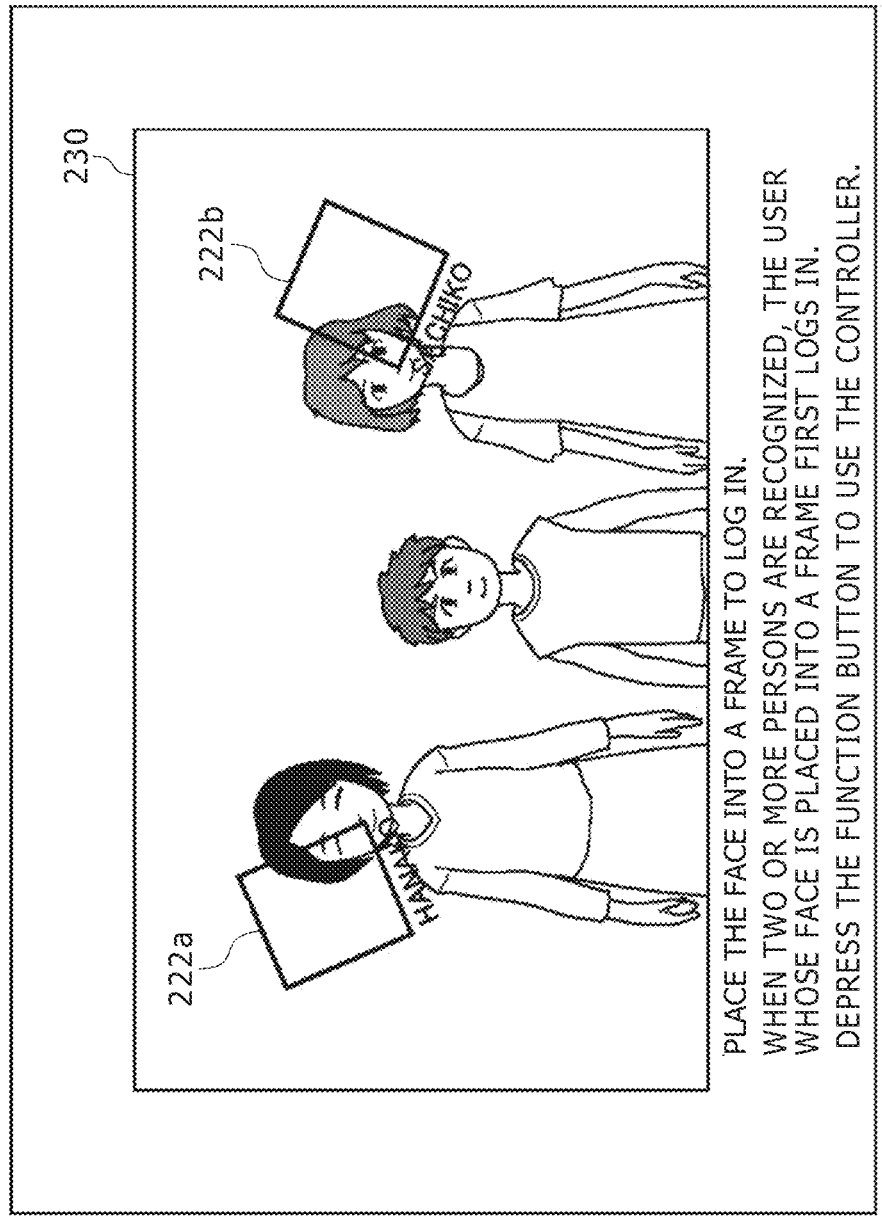
FIG. 7 is a view depicting a login screen image including a face frame.

FIG. 7 depicts a login screen image including a face frame displayed on the outputting apparatus 4. In the login screen image in the login process 3, the login processing unit 132 live displays a picked up image by the camera 7 acquired by the image acquisition unit 106 in a pickup image displaying region 230.

The login processing unit 132 extracts a portion estimated of the pickup image as the face of a person and derives characteristic amount data of the extracted portion. Then, the login processing unit 132 compares the characteristic amount data with face identification data retained in the registered user information retention unit 150 to decide whether or not the extracted face is the face of the registered user. Further, where the face of the registered user exists, the login processing unit 132 decides whether or not the registered user does not log in already.

If the face of a registered user which does not log in as yet exists, then the login processing unit 132 causes a face frame 222 to be displayed in the proximity of the face of the registered user. Here, the face frame 222a is displayed for the user A, and the face frame 222b is displayed for the user B. At this time, the login processing unit 132 causes an online ID (or a nickname or the like) of the user A to be displayed in the proximity of the face frame 222a and causes an online ID of the user B to be displayed in the proximity of the face frame 222b. Consequently, the users A and B can know that face recognition of them has been performed appropriately and know that, when they try to log in, they may move the faces thereof into the face frames 222a and 222b, respectively. It is to be noted that, since the middle user is not a registered user whose face image is registered, the face frame 222 is not displayed.

Figure 8:
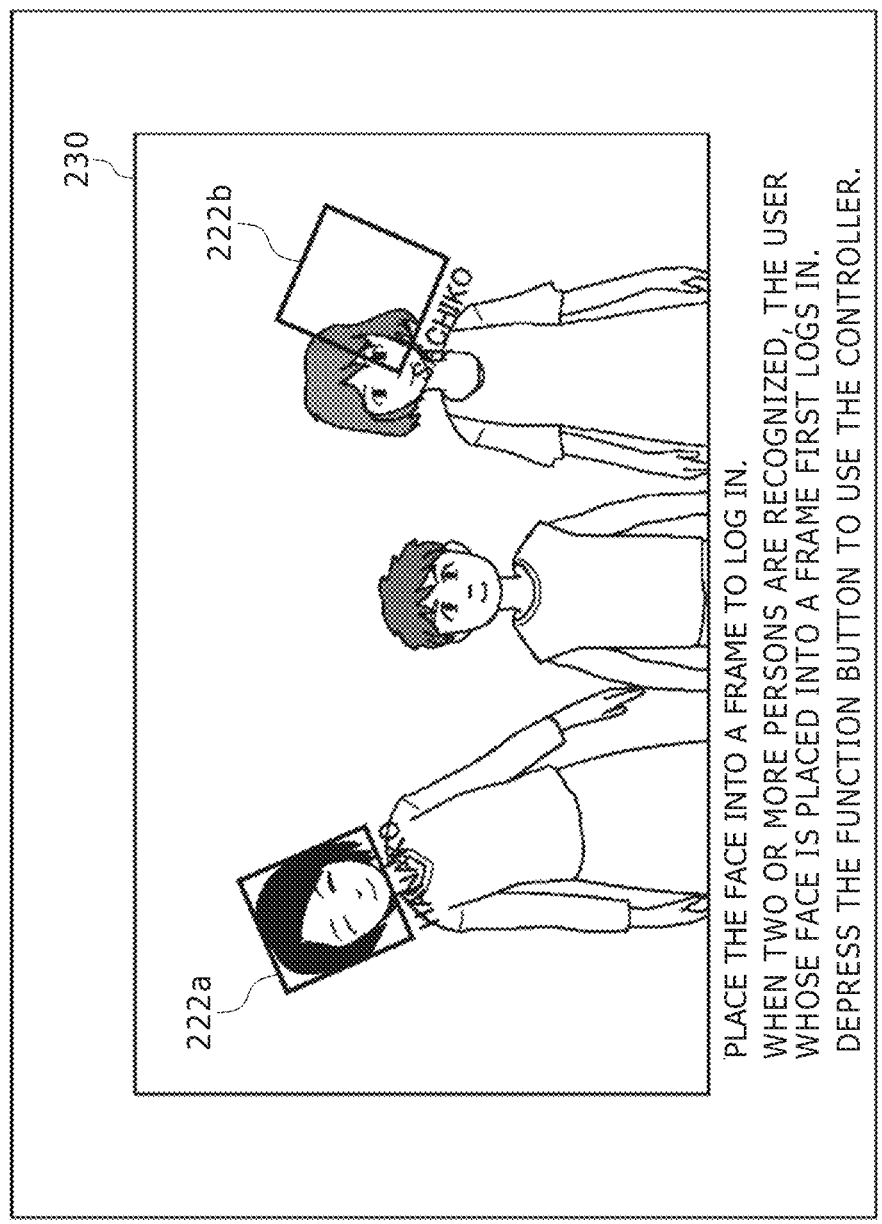
FIG. 8 is a view depicting a login screen image in which a user has placed the face in the face frame.

FIG. 8 depicts a login screen image in which a user places the face in a face frame. Here, a manner is illustrated in which the user A moves the face or the body such that the face may be placed in the face frame 222a. The login processing unit 132 supervises whether or not the face is placed in the face frame 222, and if the face is placed in the face frame 222, then the login processing unit 132 uses the face identification data retained in the registered user information retention unit 150 to decide whether or not the face placed in the face frame 222 is that of a registered user. If the login processing unit 132 decides that the face placed in the face frame 222a is that of the user A, then the login processing unit 132 causes the user A to log in to the information processing apparatus 10. The login processing unit 132 stores the login information, namely, the information for specifying the user A (user account), into the login user storage unit 134.

After the login processing unit 132 causes the user A to log in, the assignment processing unit 136 assigns an inputting device connected to the information processing apparatus 10 to the user A. The inputting device connected to the information processing apparatus 10 is an inputting device which is linked to the USB module 34 by a USB cable before the login of the user A. If no user is in a login state, then since the inputting device connected to the information processing apparatus 10 is not assigned to anyone as yet, the assignment processing unit 136 assigns the inputted device connected already to the user A who logged in first.

Further, after the login of the user A, the assignment processing unit 136 assigns the inputting device connected to the information processing apparatus 10 to the login user. If a main device such as the game controller 6 is connected to the information processing apparatus 10 in a state in which only the user A logs in, then the assignment processing unit 136 automatically assigns the connected main device to the user A. Similarly, if a sub device such as the keyboard is connected to the information processing apparatus 10 in a state in which only the user A logs in, then the assignment processing unit 136 automatically assigns the connected sub device to the user A. In this manner, if, after one user logs in, a new inputting device is connected to the information processing apparatus 10 or if an inputting device which is not assigned to any user exists, then the assignment processing unit 136 assigns the inputting device to the login user. After the assignment processing unit 136 assigns the inputting device to the login user, the assignment processing unit 136 stores the apparatus ID of the inputting device in an associated relationship with the user account into the login user storage unit 134. If a device of a type same as that of a device assigned already to the login user is connected to the information processing apparatus 10, then the assignment processing unit 136 does not assign the device of the same type to the same login user.

If only one user A logs in by the login processes 1 to 3 described above, then the assignment processing unit 136 assigns only an inputting device connected already to the information processing apparatus 10 upon login to the user A. Further, if a new inputting device is connected to the information processing apparatus 10 after the user A logs in, then the assignment processing unit 136 assigns the inputting device to the user A. As described hereinabove, in the login processes 1 and 3, a connected inputting device can be assigned automatically to the user A without displaying the user selection screen image, and also in the login process 2, only by displaying the user selection screen image first only once, an inputting device other than the game controller 6 is assigned automatically to the user A. In this manner, according to the device assignment process of the present embodiment, in any of the login processes, every time an inputting device is connected, the necessity for a work of the user to select user specification information of the user itself from the user selection screen image is eliminated, and an environment comfortable to the user can be provided.

Now, a device assignment process where two or more login users exist is described. Where two or more login users exist, if a new inputting device is connected to the information processing apparatus 10, then the selection screen image generation unit 138 causes the outputting apparatus 4 to display the user selection screen image.

Figure 9:
FIG. 9 is a view depicting another example of a user selection screen image.

FIG. 9 depicts an example of the user selection screen image. Where a plurality of login users exist, if a handle controller is connected, then the selection screen image generation unit 138 causes the outputting apparatus 4 to display a selection screen image for allowing selection of a user who is to use the handle controller.

If a new inputting device is connected to the information processing apparatus 10, then the assignment processing unit 136 refers to the login information stored in the login user storage unit 134 to confirm the number of login persons. If the login person number is one, then the assignment processing unit 136 automatically assigns the inputting device to the login user as described above. However, if the login person number is a plural number, then the assignment processing unit 136 sends a generation instruction for a user selection screen image to the selection screen image generation unit 138. Consequently, the selection screen image generation unit 138 displays the user selection screen image depicted in FIG. 9 on the outputting apparatus 4. If the user selects the user specification information on the user selection screen image, then the assignment processing unit 136 assigns the handle controller to the selected user.

In this manner, the assignment processing unit 136 makes an assignment process of an inputting device different in response to a login user or users. If the number of login users is zero in the login process 2, then the assignment processing unit 136 provides a screen image generation instruction to the selection screen image generation unit 138 to cause the selection screen image generation unit 138 to display a user selection screen image and assigns the inputting device to a user selected on the user selection screen image. If the login person number is one, then the assignment processing unit 136 does not provide a screen image generation instruction to the selection screen image generation unit 138 in order to reduce the burden on a linking work of the user. In particular, when the login person number is one, the assignment processing unit 136 assigns the inputting device to the login user without the intervention of the user selection screen image. On the other hand, when the login person number is a plural number, in order to make the linking between the inputting device and a user sure, the assignment processing unit 136 provides a screen image generation instruction to the selection screen image generation unit 138 to cause a user selection screen image to be displayed and assigns the inputting device to a user selected on the user selection screen image. Since the assignment processing unit 136 controls the device assignment process in response to the login person number in this manner, a pre-process for certain assignment where the login person number is zero, an efficient assignment process where the login person number is one and a certain assignment process where the login person number is a plural number can be implemented.

Figure 10:
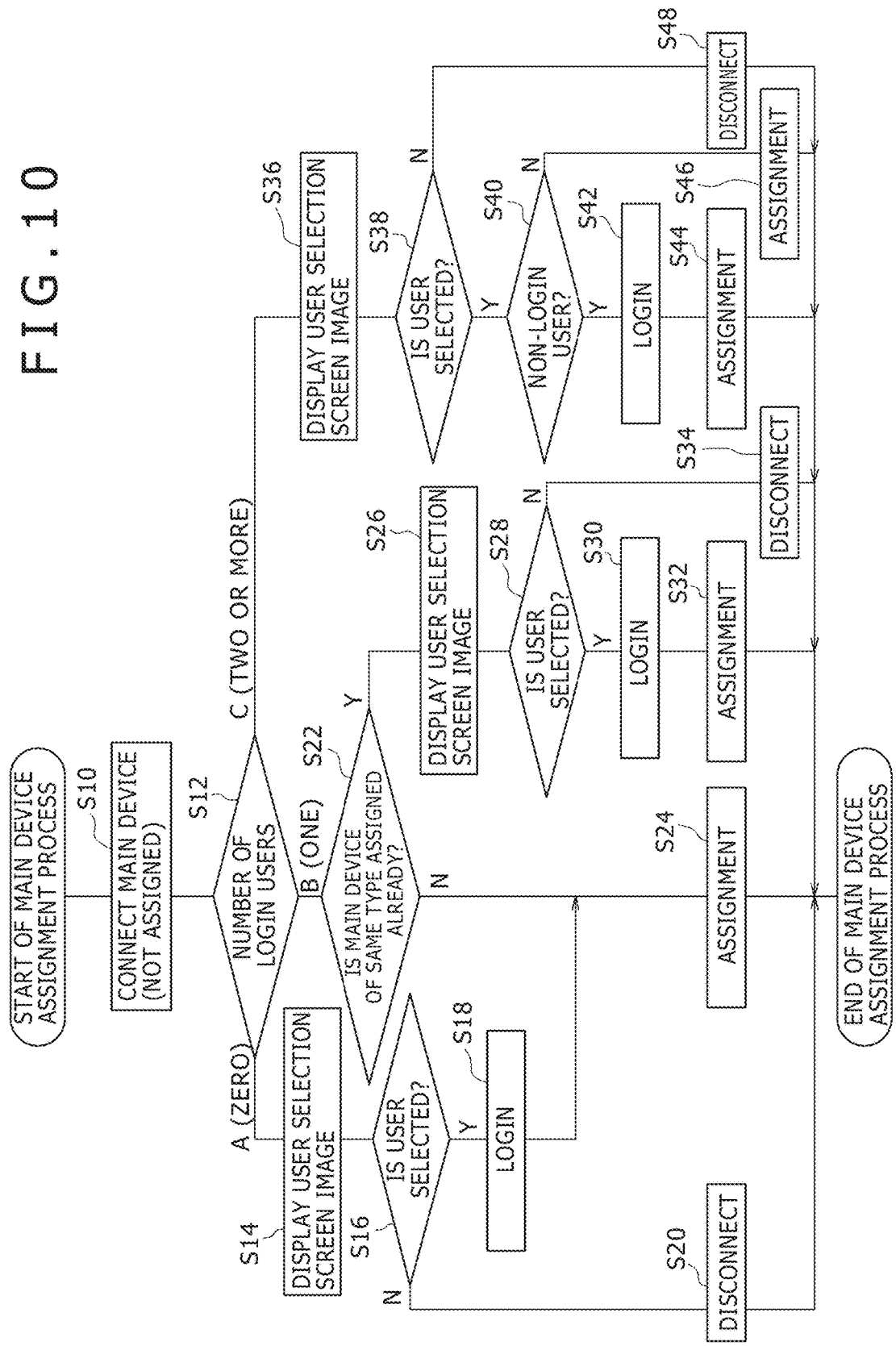
FIG. 10 is a view illustrating a processing flow of main device assignment control.

In the following, flow charts of the device assignment process in the login process 2 are depicted in FIGS. 10 and 11. In the flow charts, an assignment technique of one inputting device is indicated. It is to be noted that whether a main device or a sub device is to be assigned may be determined by referring to an apparatus ID and a definition file described hereinabove.

FIG. 10 depicts a flow chart of a main device assignment process. In this flow, a main device which is not assigned as yet is connected to the information processing apparatus 10 (S10). The assignment processing unit 136 acquires the number of login users by referring to the storage substance of the login user storage unit 134 (S12). It is to be noted that, although the login person number may be acquired by counting the number of login users in the login user storage unit 134, the count value of the login person number may be stored in the login user storage unit 134.

When the login person number is zero (A at S12), the assignment processing unit 136 sends a generation instruction of a user selection screen image to the selection screen image generation unit 138, and the selection screen image generation unit 138 causes the outputting apparatus 4 to display a user selection screen image (FIG. 6(a)) (S14). If the user does not select the user specification information on the user selection screen image but operates the cancel button (N at S16), then the connection between the main device and the information processing apparatus 10 is disconnected (S20). It is to be noted that, although it is assumed that the main device is connected by wireless connection, where the main device is connected by a USB cable, the main device may be managed as a device in a "standby state" described in connection with FIG. 11.

If the user A selects the user specification information of the user A on the user selection screen image (Y at S16), then the login processing unit 132 causes the user A to log in to the information processing apparatus 10 (S18). It is to be noted that, where a login passcode is set, the login processing unit 132 causes the outputting apparatus 4 to display an inputting screen (refer to FIG. 6(b)) of a passcode and performs user authorization using the inputted passcode to allow the user A to log in.

The assignment processing unit 136 assigns the main device to the user A (S24) and ends the assignment process. It is to be noted that, while the processing advances, after the login process at S18 in FIG. 10, directly to the assignment process at step S24, since the login person number has changed from zero to one, the processing may return to the step of S12 after the login process at S18.

If, in the state in which a main device not assigned as yet is connected (S10), the login person number is one (B at S12), then the assignment processing unit 136 decides whether a main device of the same type is assigned already to the login user (user A) by referring to the apparatus ID of the non-assigned main device (S22). For example, when the game controller 6a is assigned to the user A, if the inputting device connected newly is a joystick, then the assignment processing unit 136 decides that a main device of the same type is not assigned (N at S22) and assigns the joystick to the user A (S24), whereafter the assignment processing unit 136 ends the assignment process. On the other hand, when the game controller 6a is assigned already to the user A, if the inputting device connected newly is the game controller 6b of the same type, then the assignment processing unit 136 decides that a main device of the same type is assigned already (Y at S22).

At this time, the assignment processing unit 136 sends a generation instruction of a user selection screen image to the selection screen image generation unit 138, and the selection screen image generation unit 138 causes the outputting apparatus 4 to display a user selection screen image (S26). Although this user selection screen image may be same as the user selection screen image depicted in FIG. 6(a), since the user A already uses the game controller 6a, the user selection screen image may be a result of deletion of the user specification information of the user A from the user selection screen image depicted in FIG. 6(a). If the user does not select user specification information on the user selection screen image but operates the cancel button (N at S28), then the connection between the main device and the information processing apparatus 10 is disconnected (S34).

If the user B selects the user specification information of the user B on the user selection screen image (Y at S28), then the login processing unit 132 allows the user B to log in to the information processing apparatus 10 (S30). The assignment processing unit 136 assigns the main device (in this case, the game controller 6b) to the user B (S32) and ends the assignment process.

If, in the state in which a main device not assigned as yet is connected (S10), the login person number is equal to or more than two (C at S12), then the assignment processing unit 136 sends a generation instruction of a user selection screen image to the selection screen image generation unit 138, and the selection screen image generation unit 138 causes the outputting apparatus 4 to display a user selection screen image (S36). In this manner, where the login person number is two or more, since the assignment processing unit 136 cannot predict by which user the main device is to be used, a user selection screen image is displayed by the selection screen image generation unit 138. If the user does not select the user specification information on the user selection screen image but operates the cancel button (N at S38), then the connection between the main device and the information processing apparatus 10 is disconnected (S48).

If the user selects the user specification information on the user selection screen image (Y at S38), then the login processing unit 132 decides whether or not the selected user is a login user (S40). When the user A and the user B are login users, if the selected user is the user A or the user B (N at S40), then the login process is not performed, and the assignment processing unit 136 assigns the main device to the selected user A or user B (S46). On the other hand, if the selected user is not a login user but is the user C who does not log in (Y at S40), then the login processing unit 132 allows the user C to log in to the information processing apparatus 10 (S42). The assignment processing unit 136 assigns the main device to the user C (S44) and ends the assignment process.

FIG. 11 depicts a flow chart of a sub device assignment process. In this flow, a sub device which is not assigned as yet is first connected to the information processing apparatus 10 (S60). The sub device which is not assigned includes a sub device which has been connected by a USB cable since before the main power supply to the information processing apparatus 10 is turned on and a sub device into which a USB cable is inserted after the main power supply to the information processing apparatus 10 is turned on.

The assignment processing unit 136 acquires the number of users who log in by referring to the stored substance of the login user storage unit 134 (S62). In the information processing apparatus 10 of the present embodiment, since the user cannot play a game using a sub device of a single body, even if a sub device is connected in a state in which there is no login user, the login process is not activated. Accordingly, even if a sub device which is not assigned as yet is connected, when the login user number is zero (A at S62), the assignment processing unit 136 manages the sub device as a device in a state in which the assignment processing unit 136 waits for an assignment process (S64). This state of the sub device is hereinafter referred to as "standby state."

Now, a sub device assignment process after the user A logs in is described. If the login person number is one (B at S62) in a state in which a sub device which is not assigned as yet is connected (S60), then the assignment processing unit 136 decides whether a sub device of the same type is assigned already to the login user (user A) by referring to the apparatus ID of the not-assigned sub device (S66). For example, where a keyboard is assigned already to the user A, if the inputted device connected newly is a headset, then the assignment processing unit 136 decides that a sub device of the same type is not assigned (N at S66) and assigns the headset to the user A (S68), whereafter the assignment process is ended. On the other hand, where a keyboard is assigned already to the user A, if the inputting device connected newly is a keyboard of the same type, then the assignment processing unit 136 decides that a sub device of the same type is assigned already (Y at S66).

At this time, the assignment processing unit 136 sends a generation instruction of a user selection screen image to the selection screen image generation unit 138, and the selection screen image generation unit 138 causes the outputting apparatus 4 to display a user selection screen image (S70). At this time, if a user (for example, the user C) other than the user A who is a login user may select the user specification information of the user C (Y at S72). However, the assignment processing unit 136 assigns the sub device to the user C who is not a login user (S72). This assignment information is stored in an associated relationship with the user account of the user C, who is a non-login user, into the login user storage unit 134. It is to be noted that, if the user C thereafter logs in, then the login status of the user C in the login user storage unit 134 is changed from non-login to login.

If the user does not select the user specification information on the user selection screen image but operates the cancel button (N at S72), then the sub device is managed as a device in a standby state (S74). It is to be noted that, in an ordinary utilization scene, it is supposed that the user may operate the cancel button at S72.

If the login person number is two or more (C at S62) in a state in which a sub device which is not assigned as yet is connected (S60), then the assignment processing unit 136 sends a generation instruction of a user selection screen image to the selection screen image generation unit 138, and the selection screen image generation unit 138 causes the outputting apparatus 4 to display a user selection screen image (S70). In this manner, where the login person number is two or more, since the assignment processing unit 136 cannot predict which user is to use the sub device, the selection screen image generation unit 138 causes a user selection screen image to be displayed. If the user does not select the user specification information on the user selection screen image but operates the cancel button (N at S72), then the sub device is managed as a sub device in a standby state (S74). However, if the user selects the user specification information on the user selection screen image (Y at S72), then the assignment processing unit 136 assigns the sub device to the selected user (S76), whereafter the assignment process is ended.

The assignment process of an inputting device when the number of login users increases has been described. When the number of login users decreases, namely, when a login user logs out, the inputting device having been assigned to the user who has logged out is managed as an inputting device in a standby state. At this time, the assignment processing unit 136 may automatically assign the inputting device, which has been placed into a non-assigned state, to a remaining login user.

The present invention has been described in connection with the embodiment. The embodiment is exemplary, and it is recognized by those skilled in the art that various modifications are possible in combinations of the components and the processes of the embodiments and that also such modifications are within the scope of the present invention. While, in the embodiment, an example wherein a sub device is connected to the information processing apparatus 10 by a USB cable, a sub device may be connected to the information processing apparatus 10 by wireless connection or a main device may be connected to the information processing apparatus 10 by a USB cable.

In the description of the embodiment, it is described that the assignment processing unit 136 performs different assignment processes between a case in which one login user exists and another case in which two or more login users exist. When the number of login users is one, the assignment processing unit 136 automatically assigns, to the user, an inputting device connected already upon login of the user or an inputting device connected newly after login. However, when the number of login users is two or more, the assignment processing unit 136 instructs the selection screen image generation unit 138 to generate a user selection screen image and causes the user to declare use of the inputting device. In a modification, where the number of login users is one, the assignment processing unit 136 does not automatically assign the inputting device but may issue a confirmation message regarding whether the inputting device may be assigned to the login user. For example, if the assignment processing unit 136 detects a non-assigned inputting device, then the assignment processing unit 136 causes the outputting apparatus 4 to display a message of "May the inputting device be assigned to you" such that the assignment process is performed by depression of the OK button by the user. Also in this case, it is not necessary for the user to perform a work for selecting the user itself from within the user selection screen image, but only it is necessary for the user to merely depress an inputting unit (for example, the ○ button 72) associated with the OK button on the game controller 6. Therefore, only a simple and easy assignment work is required.

Further, while, in the description of the embodiment, it is not described whether or not an application is in an activated state upon login, when an application is in an activated state, a definition file for an application which prescribes whether each of a plurality of types of inputting devices is a main device or a sub device may be referred to determine whether the inputting device is a main device or a sub device. This definition file may be prepared for each application. Where such definition files are not prepared for all applications, only if a definition file is prepared, the definition file for the application is referred to, but if a definition file is not prepared, then a default definition file described hereinabove may be referred to.

REFERENCE SIGNS LIST

1 . . . Information processing system, 4 . . . Outputting apparatus, 6 . . . Game controller, 7 . . . Camera, 10 . . . Information processing apparatus, 85 . . . Light emitting section, 100 . . . Management unit, 102 . . . Communication unit, 104 . . . Input acceptance unit, 106 . . . Image acquisition unit, 108 . . . Microphone, 110 . . . Light emission color determination unit, 120 . . . Process determination unit, 130 . . . Login controlling unit, 132 . . . Login processing unit, 134 . . . Login user storage unit, 136 . . . Assignment processing unit, 138 . . . Selection screen image generation unit, 150 . . . Registered user information retention unit, 200 . . . Focus frame, 222 . . . Face frame, 230 . . . Picked up image displaying region.

INDUSTRIAL APPLICABILITY

The present invention can be utilized in a technology for assigning an inputting device to a user.

The invention claimed is:

1. An information processing apparatus, comprising:
an assignment processing unit configured to assign a plurality of inputting devices to one or more users of the apparatus; wherein
at least one of the inputting devices is of a first device type and at least one other of the inputting devices is of a second device type; and wherein
the first device type is used for game play to operate a game character, and the second device type is used for game play but auxiliarily to operation of a game character such that gameplay use of the second device type requires concurrent gameplay use of the first device type; and wherein
as to each inputting device newly connected to the apparatus, before the inputting device is newly connected to the apparatus, each user is either logged in to the apparatus or not logged in to the apparatus, and when the inputting device is newly connected to the apparatus, the assignment processing unit assigns the inputting device to one of the users in an assignment process in which device type and how many of the users are logged in determines, without requiring user direction of the assignment, to which user the inputting device is assigned; and wherein
the assignment process is different for devices of the first type than for devices of the second type.

2. The information processing apparatus according to claim 1, wherein the assignment processing unit executes an assignment process which is different between a case in which the number of users in a login state is one and another case in which the number of users in a login state is two or more.

3. The information processing apparatus according to claim 1, wherein, where the number of users in a login state is one, the assignment processing unit assigns the inputting device connected to the information processing apparatus to the one user.

4. The information processing apparatus according to claim 1, wherein, if the inputting device is newly connected to the information processing apparatus after one user logs in, then the assignment processing unit assigns the inputting device to the one user.

5. The information processing apparatus according to claim 1, further comprising:
a selection image generation unit configured to cause a display apparatus to display a user selection screen image on which a user can be selected,
wherein, where the number of users in a login state is zero, the selection image generation unit causes the display apparatus to display a user selection screen image for selecting a user who is to use the inputting device and the assignment processing unit assigns the inputting device to the selected user, and
where the number of users in a login state is one, the assignment processing unit assigns the inputting device to the login user without the intervention of the user selection screen image.

6. The information processing apparatus according to claim 5, wherein, where the number of users in a login state is two, the selection image generation unit causes the display apparatus to display a user selection screen image for selecting a user who is to use the inputting device and the assignment processing unit assigns the inputting device to the selected user.

7. The information processing apparatus according to claim 1, wherein a device capable of being assigned to a login user and a device not capable of being assigned to a login user are available as the one or more inputting devices, and
one of the one or more inputting devices is at least one of a game controller, a joystick and a headset.

8. A method for assigning a plurality of inputting devices to one or more users, wherein at least one of the inputting devices is of a first device type and at least one other of the inputting devices is of a second device type; and wherein the first device type is used for game play to operate a game character, and the second device type is used for game play but auxiliarily to operation of a game character such that gameplay use of the second device type requires concurrent gameplay use of the first device type the method comprising:
assigning each of the plurality inputting devices to one of the users, and determining, without requiring user direction of the assignment, to which user the inputting device is assigned based on device type and how many of the users are logged in; wherein;
as to each inputting device, before the inputting device is newly connected, each user is either logged in or not logged in, and when the inputting device is newly connected, the assignment process is started; and
the assignment process is different for devices of the first type than for devices of the second type.

9. A non-transitory, computer readable program, which when executed by a computer, causes the computer to carry out actions, comprising:

- by an assignment processing unit, assigning one or more inputting devices to a plurality of users; wherein
- at least one of the inputting devices is of a first device type and at least one other of the inputting devices is of a second device type; and wherein
- the first device type is used for game play to operate a game character, and the second device type is used for game play but auxiliarily to operation of a game character such that gameplay use of the second device type requires concurrent gameplay use of the first device type; and wherein
- as to each inputting device, before the inputting device is newly connected, each user is either logged in or not logged in, and when the inputting device is newly connected, the assignment processing unit executes an assignment process which is different between a case in which how many users are logged in is one and another case in which how many users are logged in is two or more; and wherein
- at least one of the cases determines, without requiring user direction of the assignment, to which user the inputting device is assigned; and wherein
- the assignment process is different for devices of the first type than for devices of the second type.

10. The information processing apparatus of claim 1, wherein

- when a device of the first type is newly connected to the apparatus when only one user is logged in, it is assigned, without requiring user direction of the assignment, to the logged in user unless the user has already been assigned a device of the first type; and wherein
- when a device of the second type is newly connected to the apparatus when only one user is logged in, it is assigned, without requiring user direction of the assignment, to the logged in user when the user has already been assigned a device of the second type.

* * * * *